Aug. 18, 1959  G. PIQUET  2,900,587
ELECTRIC MOTORS
Filed Feb. 13, 1957  8 Sheets-Sheet 4

Aug. 18, 1959 G. PIQUET 2,900,587
ELECTRIC MOTORS

Filed Feb. 13, 1957

United States Patent Office 2,900,587
Patented Aug. 18, 1959

2,900,587

ELECTRIC MOTORS

Georges Piquet, Paris, France, assignor to Moteurs Electriques Segal & Cie, Saint-Denis (Seine), France, a company of France Application February 13, 1957, Serial No. 639,937

Claims priority, application France February 16, 1956

2 Claims. (Cl. 318—224)

This invention relates to electric motors of the asynchronous induction type. It is an object of the invention to provide such a motor which will be operable at different speeds, in a ratio of substantially from 1 to 1.5.

It has already been proposed for similar purposes to provide an induction motor with two separate and distinct field windings each usable for a particular number of poles. With such an arrangement however part of the full winding system always remains unemployed so that the available power output is considerably reduced with respect to what would be otherwise achievable.

Other types of winding systems have been devised for such motors, wherein the winding is at all times employed in full, and wherein the effective number of poles may be altered by the switching of external circuit connections. Thus in particular, in order to alter the effective number of poles in the ratio of from 1 to 2, there have been provided field windings divided in two groups, switchable between a series connection of the two groups to provide one number of poles and a parallel connection thereof to provide the other number of poles. However no such arrangement has heretofore been developed, to the applicant's knowledge, whereby a motor could be selectively operated with four poles or with six poles using a single winding system.

It is therefore a principal object of this invention to provide a one-phase asynchronous motor operable selectively with four poles or with six poles, and one wherein the full length of field winding is constantly in effective use.

It is another object to provide a one-phase asynchronous motor which may be selectively operated at either one of two different operating speeds in a theoretical ratio of about 1/1.5, under optimum operating conditions for either speed.

Thus, a motor according to the invention supplied with A.-C. at e.g. 50 c.p.s., can be selectively operated at about 1,500 r.p.m. with four effective stator poles, or at about 1,000 r.p.m. with six effective poles, the 4-pole or 6-pole field system being obtained with a common winding system which is used in full in either instance.

An auxiliary winding may if desired be adjoined to the main winding to facilitate starting of the motor, preferably at the higher of the two available speeds.

The above and further objects, features and advantages of the invention will appear as the disclosure proceeds, with reference to the accompanying diagrammatic drawings which illustrate an exemplary embodiment of my invention.

Fig. 1 illustrates in developed view the field winding arrangement according to the invention;

Figs. 2 and 3 indicate current flow conditions in 4-pole and 6-pole operation respectively;

Figure 7:
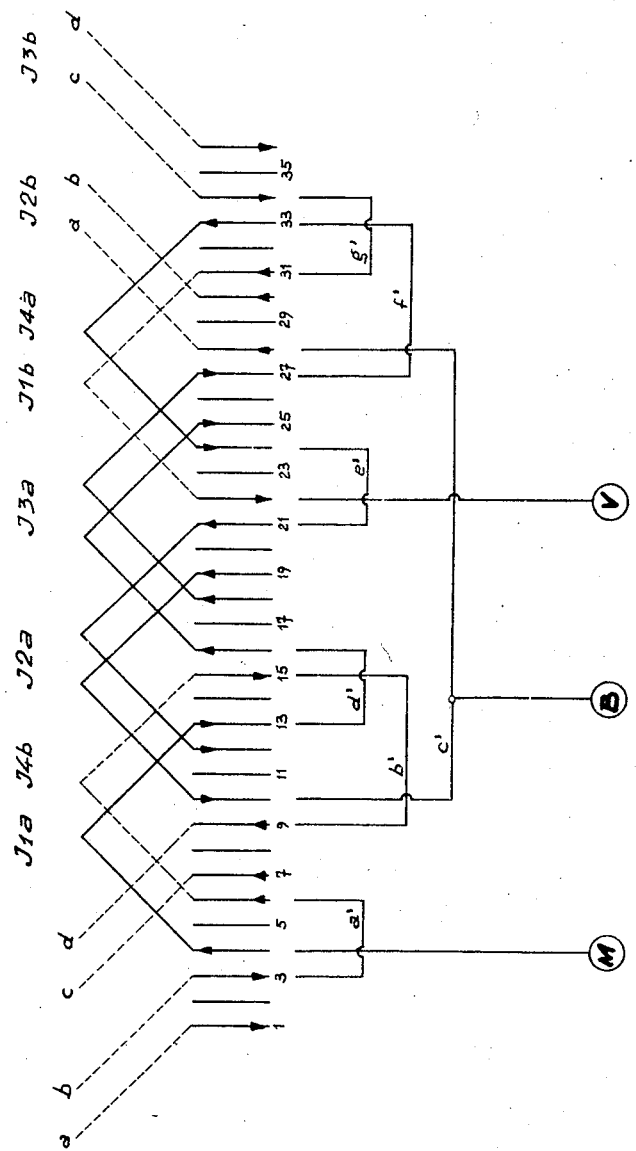
Fig. 7 illustrates a modified form of auxiliary starting winding.
Figure 8:
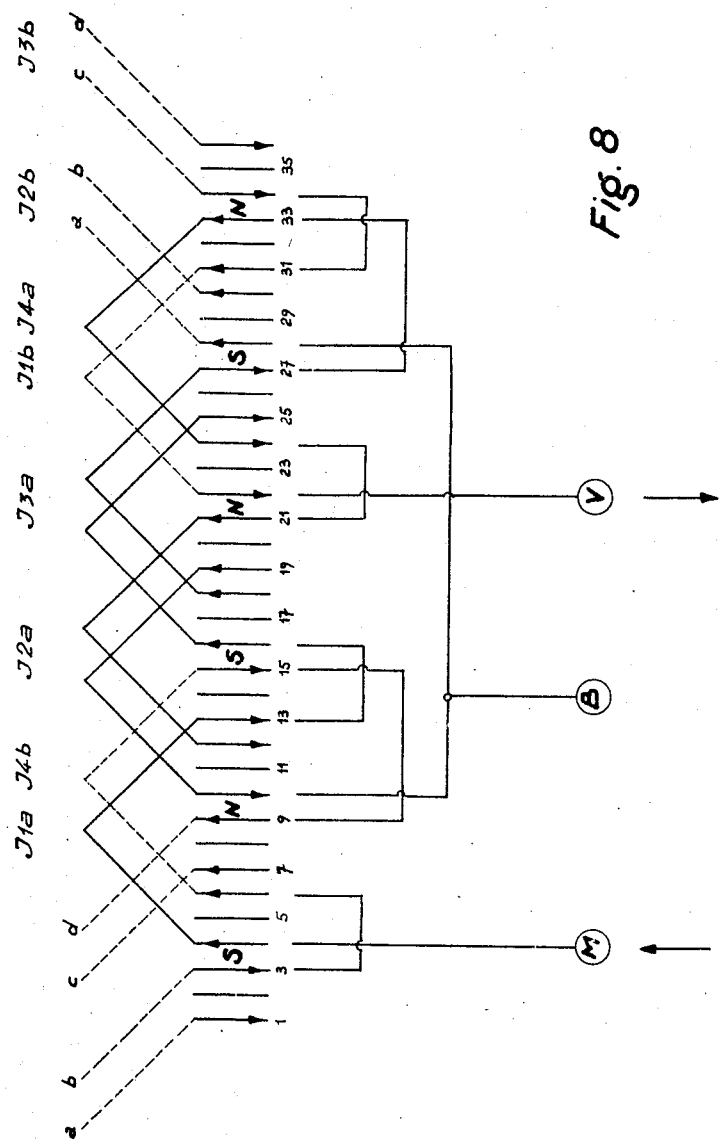
Figure 9:
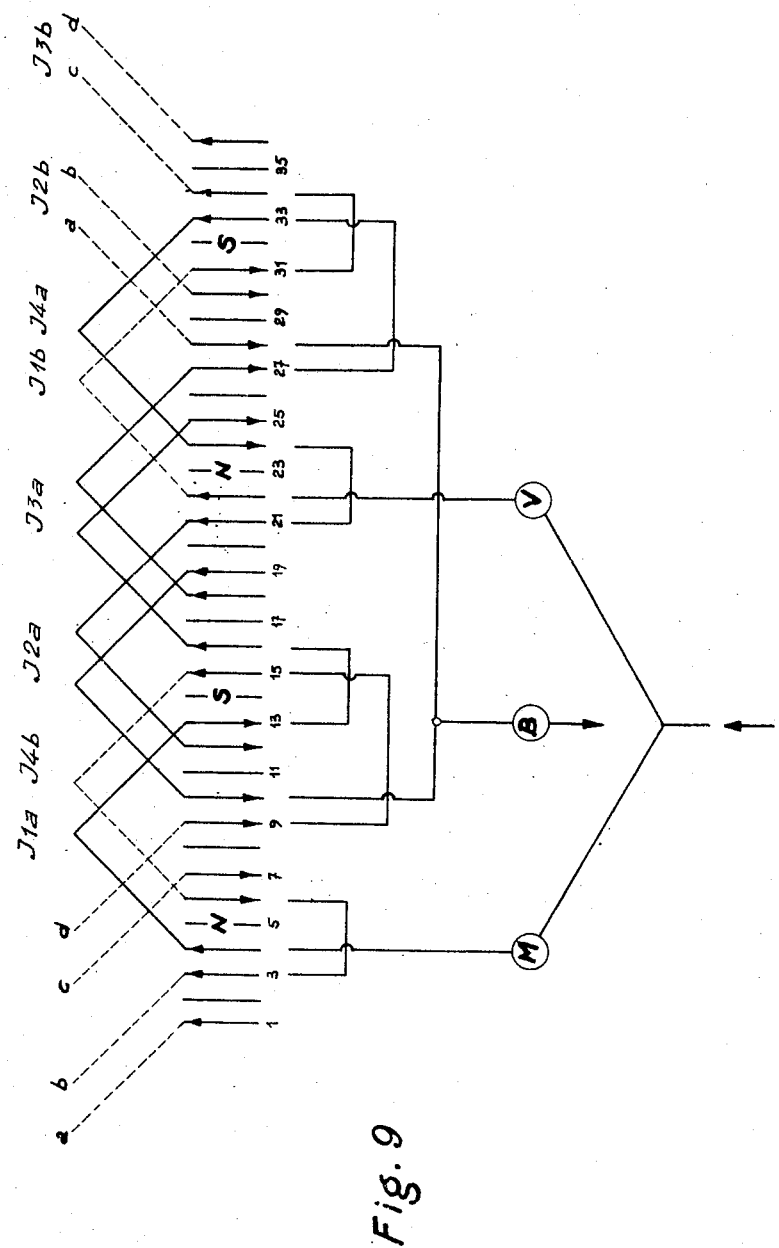

Fig. 8 indicates the directions of current flow and magnetization in the arrangement of Fig. 7 in one type of operation;

Fig. 9 is similar to Fig. 8 but relates to another type of operation;

Figs. 10 to 13 illustrate the external circuit connections established for various operating conditions.

Figure 1:
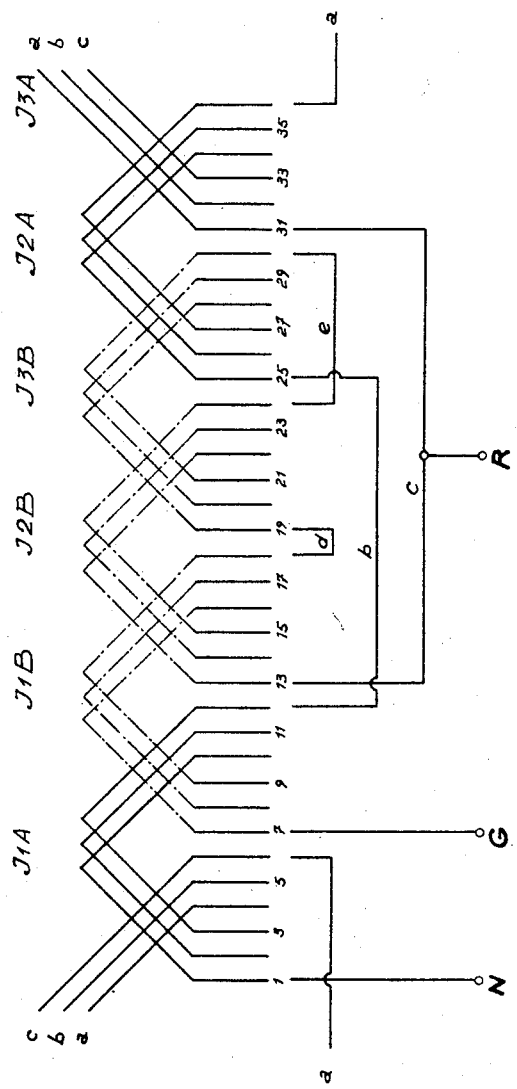

Referring first to Fig. 1, the main field winding arrangement is illustrated in developed showing as applied to a stator having 36 slots formed around its circumference. This main winding includes two groups A and B. Each group comprises 3 sets of 3 sections each, each set extending over the length of one winding pitch as from 1 to 10.

While for greater clarity only a single turn of wire has been illustrated per section, it will be understood that any desired number of turns may readily be provided in each section depending on the voltage supply requirements.

In each set the three component sections are interconnected in series in such a manner that each set comprises only two free ends to be connected. For convenience of description, the free ends of the sets will be respectively referred to as the leading and trailing ends. The connections between the sections in each set have been omitted from the drawings.

Referring first to the group designated A in the drawing, this group comprises the three sets $J_1A$, $J_2A$ and $J_3A$ illustrated in full lines. With the slots numbered from 1 to 36, the slots 1, 2 and 3, and the slots 10, 11 and 12, receive the first set of three sections $J_1A$, the slots 25, 26, 27 and the slots 34, 35 and 36 receive the second set $J_2A$, and finally the slots 31, 32 and 33 and the slots 4, 5 and 6 receive the third set $J_3A$.

The leading end of the first set $J_1A$ in slot 1 has the input supply terminal N of the winding connected to it. The trailing end of said first set in slot 12 is connected to the leading end of the second set $J_2A$ in slot 25 by way of the cross connections $b$. The trailing end of the second set $J_2A$ in slot 36 is connected to the trailing end of the third set $J_3A$ in slot 6 by way of connection $a$. And the leading end of the third set $J_3A$ in slot 31 is connected by connection $c$ to the leading end of the second set $J_2B$ of the B group in slot 13.

Referring next to the B group, this includes the 3 sets $J_1B$, $J_2B$ and $J_3B$ shown in chain lines. The slots 7—8—9 and 16—17—18 receive therein the first set $J_1B$, slots 13—14—15 and 22—23—24 receive the second set $J_2B$ and slots 19—20—21 and 28—29—30 receive the third set $J_3B$. The leading end of the first set $J_1B$ in slot 7 is connected with the supply terminal G of the winding. The trailing end of said first set in slot 18 is connected with the leading end of the third set in slot 19 by way of connection $d$. The trailing end of the third set $J_3B$ in slot 30 is connected with the trailing end of the second set $J_2B$ in slot 24 by way of connection $e$, while the leading end of the second set $J_2B$ in slot 13 is connected by way of connection $c$ with the leading end of the set $J_3A$ in slot 31 as previously noted. A terminal R connected with the lead $c$ provides a third supply terminal of the winding.

Figure 2:
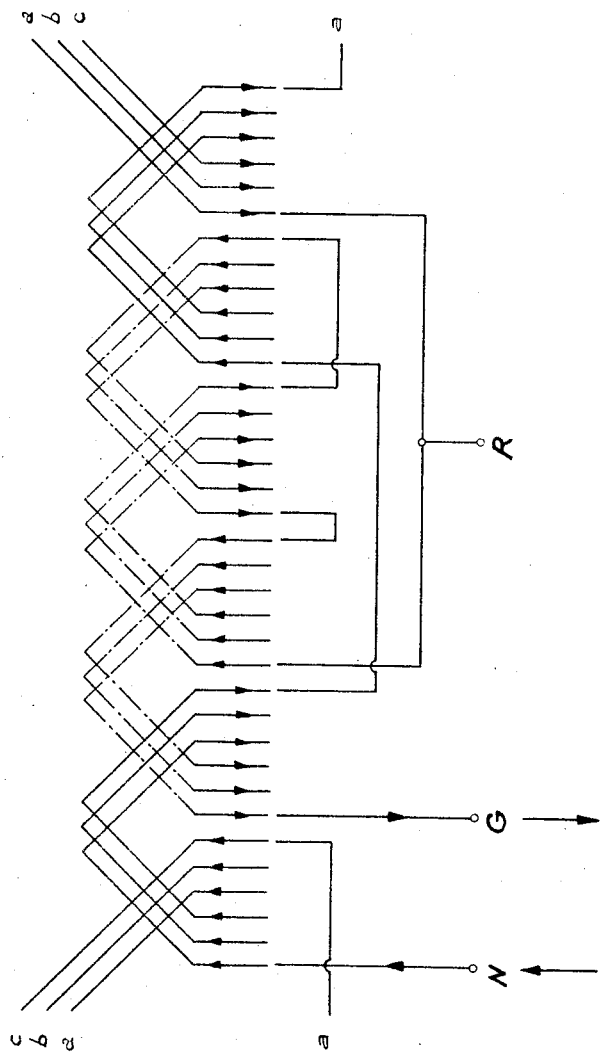

Six-pole operation of the field winding system just described is illustrated in Fig. 2, whence it will be seen that the current fed by way of supply terminal N flows through all the turns in groups A and B and out by way of supply terminal G. As indicated by the arrows in the figure, the lines of magnetic flux in the slots are so directed relatively to one another in adjacent slots, as to create six magnetic poles around the stator circumference.

Figure 3:
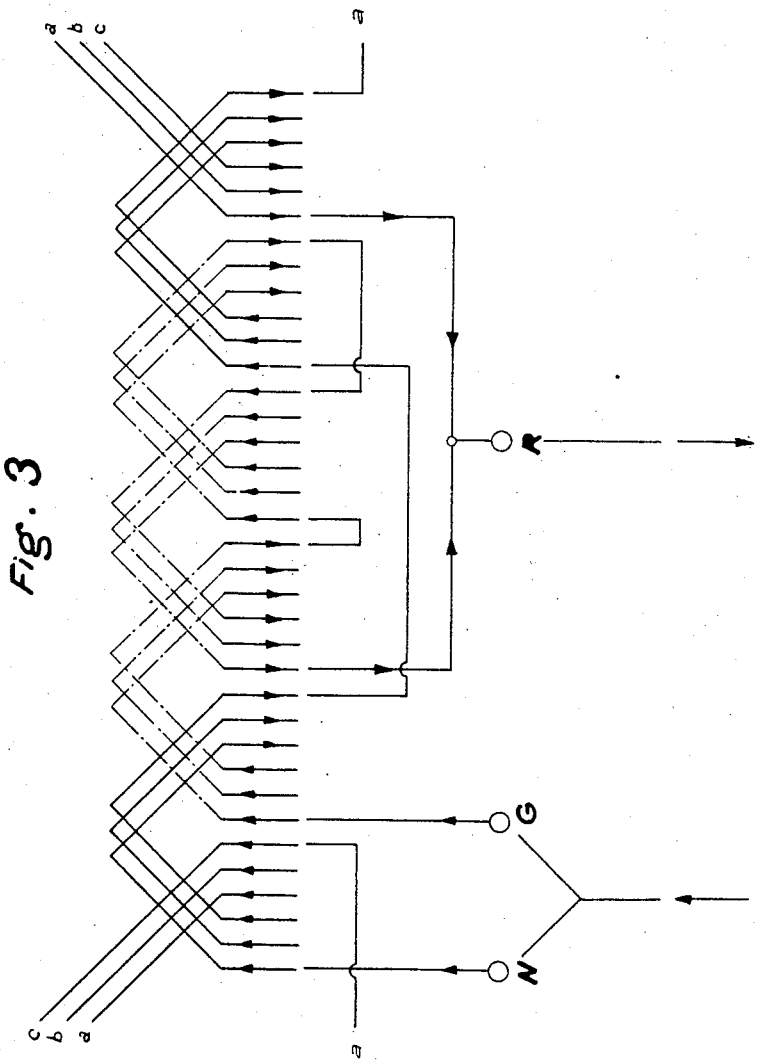

To provide four-pole operation, the supply terminals N and G are cross connected together as shown in Fig. 3 to provide a common terminal, and it will be seen that the current again flows throughout all the windings in groups A and B but now flows out by way of supply terminal R which provides the output terminal. As indicated by the arrow pattern in Fig. 3, the stator windings now provide only four effective poles around the circumference.

It may be noted that in the 6-pole condition the groups A and B are connected in series while in the 4-pole operation the groups A and B are in parallel, a situation that is desirable for producing a higher power output in the 4-pole type of operation.

Figure 4:
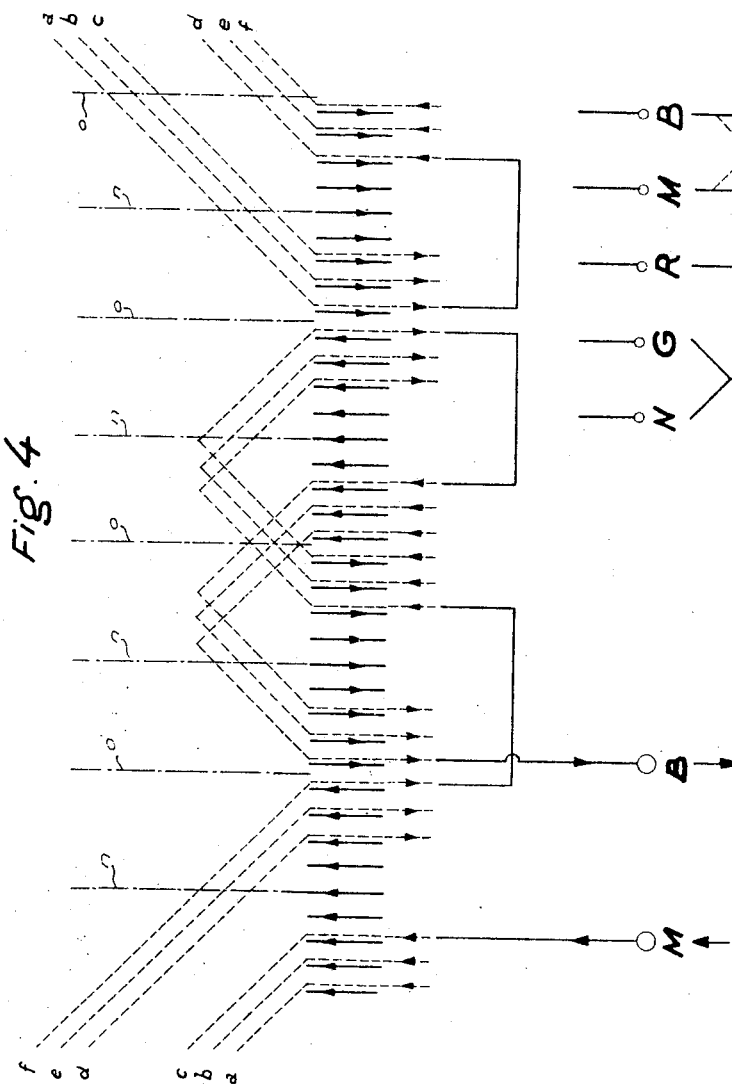
Fig. 4 illustrates the provision of an auxiliary starting winding.

For starting the motor connected for 4-pole operation, an auxiliary winding may be provided as shown in dotted lines in Fig. 4, it being so wound in the slots that the 4 auxiliary poles created thereby have their axes, indicated at $n$, positioned in electrical phase-quadrature relatively to the axes $o$ of the 4 main winding poles. The terminals M and B constitute the input of the auxiliary winding which is adapted to be supplied e.g. from a condenser $k$ as shown in Fig. 5 which illustrates the circuit connections to be established in such 4-pole operation.

Figure 6:
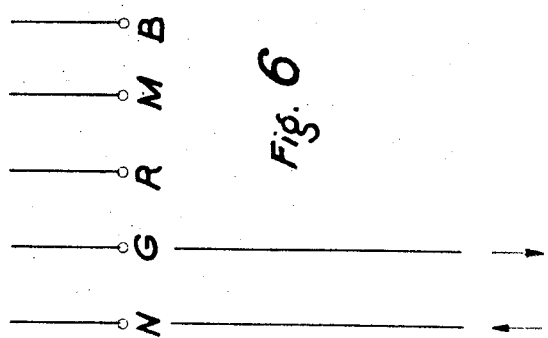
Fig. 6 shows circuit connections for 6-pole operation after the motor has been started in the 4-pole condition.

The auxiliary winding may be retained in service permanently to provide for 4-pole operation or it may be connected-in temporarily for starting purposes and then cut out by any suitable means, manually or automatically, to switch to 6-pole operation in normal service. It will be understood that in this case the motor is started at the higher velocity imparted by the 4-pole field, and that when the auxiliary winding is switched out, the motor speed will drop gradually until its rotor gets into step with the 6-pole stator field. The condition of the circuit after the auxiliary winding has been disconnected for normal 6-pole operation is illustrated in Fig. 6, wherein terminals R, M and B are unused.

Figure 5:
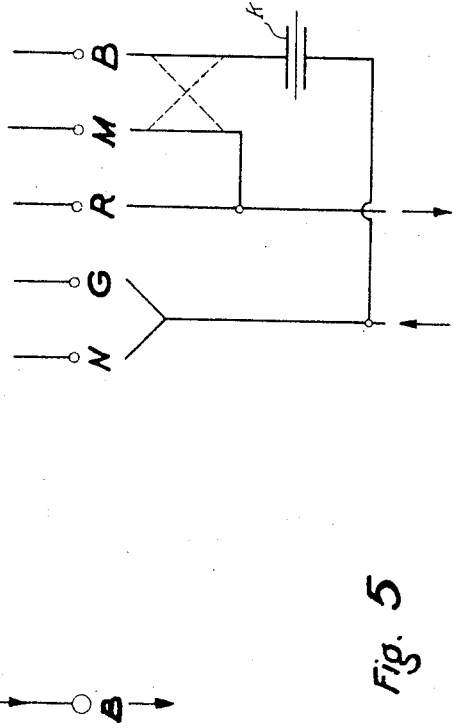
Fig. 5 shows circuit connections for 4-pole operation.

In order to reverse the direction of motor rotation at starting, the connections supplying the auxiliary winding need simply be reversed as illustrated in dotted lines in Fig. 5.

It will be understood that a similar auxiliary winding might be provided for starting in the 6-pole condition if desired, but this would generally be a superfluous complication since it is possible to start with 4 poles and then shift to 6-pole operation as described above. An auxiliary winding similar to the main winding might be provided, but the electrical phase quadrature displacement between the main and auxiliary poles cannot then be achieved in both instances.

Alternatively an auxiliary starting winding of more elaborate construction now to be described, may be provided which would provide either 4 or 6 poles with the proper 90° phase displacement in either case. Such an auxiliary starting winding is shown in Fig. 7, and is seen to employ the same slots 1 to 36 as the main winding. In this type of winding different types of sets of sections are used including a single section or two series-connected sections, but the series connections have not been illustrated for greater clarity. As shown, the full-line sections comprise a first group which may be termed the A group, while the dotted-line sections comprise a B group. As shown in Fig. 7, the sections of the auxiliary winding of this type are received in the slots according to a pattern that will be understood from the following tabulation:

1st set $J_1a$, single section, slots 4–13_____ Group A
2nd set $J_2b$, single section, slots 6–15_____ Group B
3rd set $J_2a$, two sections, 10–19 and 12–21____ Group A
4th set $J_3a$, two sections, 16–25 and 18–27____ Group A
5th set $J_1b$, single section, slots 22–31_____ Group B
6th set $J_4a$, single section, slots 24–33_____ Group A
7th set $J_2b$, two sections, slots 28–1 and 30–2__ Group B
8th set $J_3b$, two sections, slots 34–7 and 36–9__ Group B Slots 2, 5, 8, 11, 14, 17, 20, 23, 26, 29, 32 and 35 are not used for the auxiliary winding.

It will be seen that the sets comprising the A group are connected in series in such a manner as to produce the directions of current flow shown by the upper arrows in Fig. 7, while the sets of B group are similarly connected in series in such a manner as to produce the directions of current flow indicated by the lower arrows in the figure. Moreover, the A group is connected in series with B group in such a way that the directions of current flow in both groups correspond to the directions shown by both the upper and lower arrows in the diagram. Thus, to achieve the relationships just stated, the connections may be effected e.g. as follows:

Trailing end of set $J_2b$ in slot 3 is connected with leading end of set $J_4b$ in slot 6 by connector $a'$.
Trailing end of set $J_2b$ in slot 9 is connected with trailing end of set $J_4b$ in slot 15 by connector $b'$.
Leading end of set $J_2a$ in slot 10 is connected with leading end of set $J_2b$ in slot 28 by connector $c'$.
Trailing end of set $J_1a$ in slot 13 is connected with leading end of set $J_3a$ in slot 16 by connector $d'$.
Trailing end of set $J_2a$ in slot 21 is connected with leading end of set $J_4a$ in slot 24 by connector $e'$.
Trailing end of set $J_3a$ in slot 21 is connected with trailing end of set $J_4a$ in slot 33 by connector $f'$.
Trailing end of set $J_1b$ in slot 31 is connected with leading end of set $J_3b$ in slot 34 by connector $g'$.
Leading end of set $J_1a$ in slot 4 is connected with supply terminal M.
Leading end of set $J_1b$ in slot 22 is connected with supply terminal V.
Connector $c'$ is connected with terminal B.

Supply current being fed to terminal M, it will be seen that the current will flow through the conductors indicated by all of the arrows in Fig. 8 to the output terminal V. The A group is in series with B group and there are thus provided six poles, 3 north and 3 south, as clearly apparent from Fig. 8.

If on the other hand current is fed in common to both terminal M and V interconnected as shown in Fig. 9, the current flow will be effected as shown by the arrows in that figure towards the terminal B. Here groups A and B are seen to be connected in parallel and 4 poles will have been provided, 2 north and 2 south.

The respective positions of the polar axes should be noted in each of the above two instances. Thus it will be seen that in the 6-pole connections shown in Fig. 8, the axes of the poles of the auxiliary winding are positioned at the midpoint between the slots of each of the following pairs; slots 3 and 4; slots 9 and 10; slots 15 and 16; slots 21 and 22; slots 27 and 28; and slots 33 and 34. Reverting to Fig. 2, it will be observed that the axes of the poles of the main winding were positioned at the midpoints between the slots of each of the following pairs; slots 6 and 7; slots 12 and 13; slots 18 and 19; slots 24 and 25; slots 30 and 31 and slots 36 and 1. Thus it is shown that the pole axes of the auxiliary winding are electrically phase-displaced in quadrature with the pole axes of the main winding, as previously indicated.

A similar condition obtains in 4 pole operation. Thus from Fig. 9 it is seen that the auxiliary pole axes are positioned at the slots 5; 14; 23 and 32. Fig. 3 similarly shows that the main pole axes are positioned at the midpoints between the slots of each of the following pairs: 9 and 10; 18 and 19; 27 and 28; and 36 and 1. It will be seen that the phase-quadrature relationship still holds.

Figure 10:
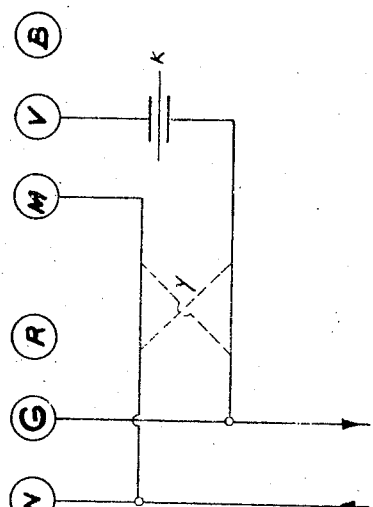
Figure 12:
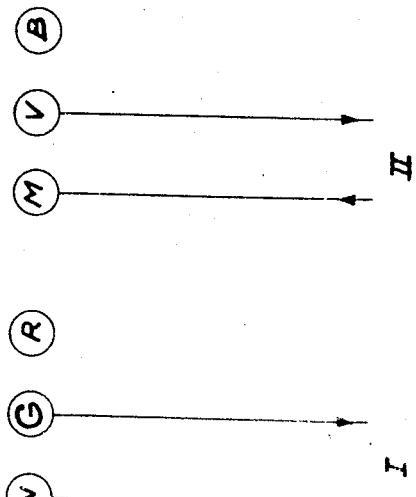

The external circuit connections for 6-pole operation with the improved auxiliary winding just described are illustrated in Fig. 10. Charging capacitor $k$ is connected across terminals V and G of the auxiliary winding. Reversal of motor operation may be accomplished by crossing over the connections as shown in dotted lines at $y$.

Figure 11:
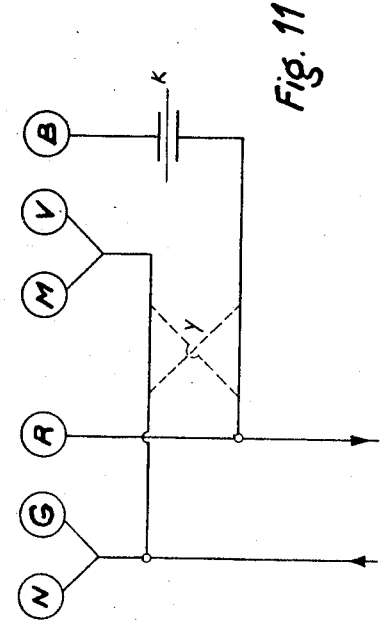

Similarly, Fig. 11 illustrates the external connections to be provided for 4-pole operation with the auxiliary winding described.

Figure 13:
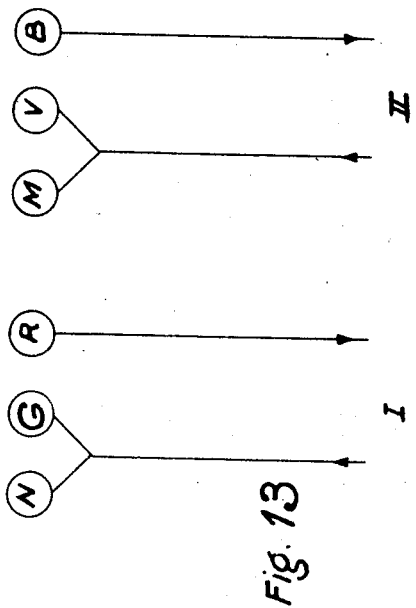

While the A.-C. supply for operating the motor was mentioned as being a single-phase supply, a two-phase supply source may be used, it being simply required to take care that the proper number of turns be included in each winding to balance the phases. Thus in Fig. 12, the main winding is shown connected across phase I of a two-phase supply, and the auxiliary winding across phase II thereof, such connections providing for six-pole operation. Fig. 13 similarly illustrates the connections used for providing for four-pole operation with a two-phase supply source.

The rotor of the improved motor may comprise a conventional squirrel-type or short-circuited rotor.

Various modifications may be made in the details illustrated and described, without exceeding the scope of the invention as will be apparent to anyone familiar with the art. Thus, each set of conductors may include a different number of sections, with the number of slots being correspondingly altered. For example, there may be provided for the main winding 12 slots with a single section per set, or again 24 slots with two sections per set, and so on. The auxiliary winding would then occupy slots equal in number to an integral multiple of 24, and would include four sets of $n$ sections and 4 sets of $2n$ sections, where $n$ designates the said integral multiple.

To ensure that the pole axes of both windings will be in electrical quadrature, it is necessary that the input supply terminal M of the auxiliary winding be spaced by $Q/12$ slots from the input terminal of a main winding so constructed as to occupy all of the stator slots, where $Q$ is the total number of slots in the stator.

What I claim is:

1. In an induction motor having first, second and third motor supply terminals and a rotor and a stator, a field winding arrangement on said stator comprising six sets of conductor sections, each set including leading and trailing ends, means connecting the leading end of a first of said sets to the first motor supply terminal, means connecting the trailing end of said first set to the leading end of a fifth of said sets, means connecting the trailing end of the fifth set to the trailing end of a sixth of said sets, means connecting the leading end of the sixth set to the leading end of a third of said sets and to the second motor supply terminal, means connecting the trailing end of the third set to the trailing end of a fourth of said sets, means connecting the leading end of the fourth set to the trailing end of a second of said sets, and means connecting the leading end of the second set to the third supply terminal, whereby with said first and third terminals connected across a one-phase supply the current flow through all said conductor sections will set up six magnetic poles in said stator, while with said first and third terminals connected in common with one side of said supply and said second terminal connected to the other side of said supply the current flow through all said conductor sections will set up four magnetic poles in said stator.

2. In an induction motor having first, second and third motor supply terminals and a rotor and a stator, an auxiliary starting winding comprising eight sets whereof a first, second, fifth and sixth sets comprise $n$ sections while the remaining sets comprise $2n$ sections, the sets having inter-axial spacings with the interaxial spacing between the first and second sets and the interaxial spacing between the fifth and sixth sets being the same as the interaxial spacing between each of the two assemblies of $n$ consecutive sections of a common set including $2n$ sections, means connecting the leading end of the first set to the first motor supply terminal, means connecting the trailing end of said first set to the leading end of the fourth set, means connecting the trailing end of the fourth set to the trailing end of the sixth set, means connecting the leading end of the sixth set to the trailing end of the third set, means connecting the leading end of the third set to the leading end of the seventh set and to the second motor supply terminal, means connecting the trailing end of the seventh set to the leading end of the second set, means connecting the trailing end of the second set to the trailing end of the eighth set, means connecting the leading end of the eighth set to the trailing end of the fifth set and connecting the leading end of the fifth set to the third motor terminal.

References Cited in the file of this patent

UNITED STATES PATENTS

| | | |
|---|---|---|
| 1,366,984 | Meichsel | Feb. 1, 1921 |
| 2,174,758 | Rall | Oct. 3, 1939 |
| 2,267,805 | Appleman | Dec. 30, 1941 |
| 2,715,204 | Siskind | Aug. 9, 1955 |

FOREIGN PATENTS

| | | |
|---|---|---|
| 47,702 | Sweden | Sept. 8, 1920 |